United States Patent Office 3,663,674
Patented May 16, 1972

3,663,674
DENSIFICATION OF POLY-α-OLEFINS
Allan D. Holiday, Overland Park, Kans., assignor to Gulf Research & Development Company, Pittsburgh, Pa.
No Drawing. Filed July 1, 1969, Ser. No. 838,351
Int. Cl. B01j 2/20
U.S. Cl. 264—118
4 Claims

ABSTRACT OF THE DISCLOSURE

Poly-α-olefins are prepared in a dense granular form suitable for molding or extrusion by the application of sufficient mechanical energy to compress and collapse the porous polymer particles recovered from the polymerization reactor.

BACKGROUND OF INVENTION

Poly-α-olefins are conventionally produced by low pressure polymerization processes employing catalysts such as described in U.S. Pat. 3,219,648. Conventionally, such olefin polymerization processes are carried out in the liquid phase such as in a hydrocarbon solvent or diluent, especially paraffins or cycloparaffins which are liquid under the ploymerization conditions.

Poly-α-olefins, such as polypropylene, produced by conventional polymerization processes are normally in the form of very fine particles having a low bulk density. The term "bulk density" refers to the weight per unit volume of a bed of the particulate material, the voids in and between the solid particles being filled with air or inert gas at atmospheric pressure. In order that such low bulk density poly-α-olefins can be utilized in the preparation of useful articles of manufacture by injection molding, extrusion or the like, it is normally necessary to melt the polymer particles, thereby separating the air from the voids. The polymer particles are then fused into a homogenous melt that is substantially free of dissolved gas.

Under these conditions, the polymer is normally subjected to two high temperature exposures in extruders. The first exposure occurs at the manufacturing site wherein the polyolefin powder of low bulk density is extruded into pellets by the method described above, and the second high temperature treatment occurs at the fabrication plant where the pellets of increased bulk density are molded or extruded into articles of manufacture. Such excessive high temperature treatment of oxidation sensitive materials such as polypropylene results in thermal degradation of the polymer.

Accordingly, an object of the invention is to provide an improved process for increasing the bulk density of poly-α-olefin polymers.

Another object of the invention is to provide a process for increasing the bulk density of polypropylene.

Yet another object of the invention is to provide a process for increasing the bulk density of poly-α-olefins wherein the bulk density is increased by at least two-fold.

Other objects, advantages and features of this invention will be readily apparent to those skilled in the art from the following description and claims.

SUMMARY OF INVENTION

In one embodiment of the invention, poly-α-olefin polymer powder recovered from the reactor is dried and thereafter subjected to sufficient mechanical energy so as to collapse the porous polymer particles. In a second embodiment of the invention, the polymer powder, after drying and blending with an antioxidant, is subjected to sufficient mechanical energy so as to collapse the porous polymer particles. By the invention a poly-α-olefin polymer having increased bulk density is obtained. When applied to the production of polypropylene, a two to three-fold increase in bulk density can be obtained. For example, the bulk density of the polypropylene can be increased from 6 to 10 pounds per cubic foot to at least as high as 30 pounds per cubic foot.

DESCRIPTION OF THE INVENTION

The process of this invention can be employed to densify α-olefin polymers generally, and is particularly adapted to densifying polymers which are prepared by conventional low pressure processes. The processes particularly adapted to the densification of polymers of α-olefins containing 2 to 10 carbon atoms. Hence, polymers can be densified in accordance with the process of this invention and include, for example, polyethylene, polypropylene, propylene, polybutene, poly-3-methylene-butene-1, poly-4-methyl-pentene-1, polyhexene, as well as copolymers of these and other α-olefins, for example, a 95/5 propylene-ethylene polymer and the like.

A suitable process for the preparation of poly-α-olefin which can be employed in the process of the invention is described in U.S. 3,219,648. As described therein, a 1-olefin such as polypropylene, butene-1, pentene-1, hexene-1, or 4-methyl-1 pentene is polymerized in the presence of a catalyst comprising an organometallic compound, a metal halide and an additive selected from the group consisting of polyamines, aminoethers, aminoalcohols, and hydroxyethers which chelates metals. The metal of the organometallic compound is selected from a member of the group consisting of Groups II-A, II-B and III-A of the Periodic Table. The metal of the metal halide is selected from a member of the group consisting of Groups IV-B, V-B and VI-B of the Periodic Table. Polymerization is readily effected in an inert solvent such as benzene at a temperature from about 0° C. to 200° C. The polymerization is normally effected at about atmospheric pressure or slightly higher.

At completion of the polymerization reaction, the polymer slurry recovered from the polymerized reactor can be filtered to isolate the resinous polyolefin. Low molecular weight or non-resinous polymers remain in solution in the filtrate. The solid products so obtained can then be freed of catalyst residues by any of several known procedures. A suitable method is to stir a slurry of the polyolefin in water or alcohol such as methanol and then remove the insoluble resinous polyolefin by filtration to give a white polymer product. The polyolefin soluble in the reaction solvent can be isolated by adding an excess of methanol and filtering off the precipitated polymer.

The recovered insoluble polymer is then dried and processed through a means for subjecting the porous polyolefin powder to sufficient mechanical energy or pressure so as to collapse the porous polymer particles. A suitable means for subjecting the porous particles to high mechanical pressures is the employment of a pellet mill such as maufactured by California Pellet Mill Company.

In operation of a pellet mill such as California Pellet Mill Model CL–4 the material is extruded as pellets determined by positioning the pellet knife a predetermined distance away from the die. The polymer material is fed to the pellet mill by a feeder screw. The die through which the polymer material is forced is mounted on a shaft of the pellet mill which is driven by the main drive motor. A roller is mounted on the roller shaft which rotates in bearings encased in the pellet chamber housing, being driven by contact with the rotating die, thereby subjecting the porous polymer particles to high mechanical pressures.

In the second embodiment of the invention, the dried poly-α-olefin polymer is dry blended with a conventional antioxidant and the resulting admixture subjected to sufficient mechanical energy so as to collapse the porous polymer particles in the manner described above.

Although not to be limited thereto, the invention is particularly applicable in densifying polyolefin powders having a bulk density of 10 pounds per cubic foot or less. It has been observed that polypropylene powder having a bulk density in the range of from 6 to 10 pounds per cubic foot can be densified to obtain a polypropylene powder having a bulk density as high as 30 pounds per cubic foot.

Poly-α-olefin polymers having relatively fine particle size and high bulk density are particularly desirable for many commercial applications. Such polymers are well suited for blending operations in which pigments or powdered fillers are to be added to the poly-α-olefin polymers. The higher bulk density of the poly-α-olefin polymers results in reduced handling costs. Furthermore, the final product processing step employed in the polymer fabricator's plant would be the first exposure of the polymer to high temperatures such as necessarily required in the operation of extruders or other fabricating equipment.

The following example is presented to illustrate the objects and advantages of the invention. It is not intended, however, to limit the invention to this specific embodiment described therein.

EXAMPLE I

Polypropylene having a bulk of 8.45 pounds per cubic foot was introduced into a California Pellet Mill, Model CL-4 at the rate of 152.2 pounds per hour. The pellet mill die was 1/8" x 1", and the pellet knife was set a distance of 1/4" from the die base. The main drive motor of the pellet mill was operated at 1800 r.p.m. The polypropylene recovered from the pellet mill had a bulk density of 19.9 pounds per cubic foot which represented a 2.35 fold increase in bulk density.

Although the invention has been described with reference to the specific materials, embodiments and details, there is modifications and changes, within the scope of this invention, will be apparent to one skilled in the art and are contemplated to be embraced in the invention.

I claim:

1. A process for densifying and forming pellets from porous poly-α-olefins, comprising:
   (a) placing porous poly-α-olefin powder within a pellet mill mechanically compressing said powder to increase the density thereof while maintaining said powder in a solid state,
   (b) pelletizing said compressed poly-α-olefin leaving said pellet mill, and
   (c) recovering said pellets of increased bulk density.

2. The process of claim 1 wherein said poly-α-olefin is polypropylene.

3. The process of claim 2 wherein sufficient pressure is applied to said polypropylene in said Pellet mill so as to effect at least a two-fold increase in bulk density.

4. The process of claim 3 wherein the product polypropylene has a bulk density of at least 30 pounds per cubic foot.

References Cited

UNITED STATES PATENTS

| | | | |
|---|---|---|---|
| 3,193,601 | 6/1965 | Billingsley | 264—142 |
| 3,415,917 | 12/1968 | Watanabe et al. | 264—142 |

ROBERT F. WHITE, Primary Examiner

J. R. HALL, Assistant Examiner